(12) United States Patent
Radiar

(10) Patent No.: US 10,578,303 B2
(45) Date of Patent: Mar. 3, 2020

(54) INLET ASSEMBLY

(71) Applicant: Edwards Limited, Burgess Hill, West Sussex (GB)

(72) Inventor: Alageswaren Reddi Balsamy Radiar, Burgess Hill (GB)

(73) Assignee: Edwards Limited, Burgess Hill, West Sussex (GB)

( * ) Notice: Subject to any disclaimer, the term of this patent is extended or adjusted under 35 U.S.C. 154(b) by 171 days.

(21) Appl. No.: 15/743,417

(22) PCT Filed: Jun. 22, 2016

(86) PCT No.: PCT/GB2016/051861
§ 371 (c)(1),
(2) Date: Jan. 10, 2018

(87) PCT Pub. No.: WO2017/013384
PCT Pub. Date: Jan. 26, 2017

(65) Prior Publication Data
US 2018/0209644 A1 Jul. 26, 2018

(30) Foreign Application Priority Data

Jul. 20, 2015 (GB) .................................. 1512672.5

(51) Int. Cl.
*F23G 7/06* (2006.01)
*B01D 53/68* (2006.01)
(Continued)

(52) U.S. Cl.
CPC ............. *F23G 7/065* (2013.01); *B01D 53/68* (2013.01); *B01D 53/76* (2013.01); *F23C 99/006* (2013.01);
(Continued)

(58) Field of Classification Search
CPC .. B01D 53/68; B01D 53/76; B01D 2257/204; B01D 2258/0216; B01D 2257/553;
(Continued)

(56) References Cited

U.S. PATENT DOCUMENTS 3,923,448 A 12/1975 Guth
4,909,733 A * 3/1990 Yap ...................... C03B 5/2353
239/132.3
(Continued)

FOREIGN PATENT DOCUMENTS

CN 202149495 U 2/2012
CN 203068532 U 7/2013
(Continued)

OTHER PUBLICATIONS

First Office Action dated Jan. 4, 2019 and Search Report dated Dec. 19, 2018 for corresponding Chinese Application No. CN201680042748.5.

(Continued)

*Primary Examiner* — Alfred Basichas
(74) *Attorney, Agent, or Firm* — Westman, Champlin & Koehler, P.A.; Theordore M. Magee

(57) ABSTRACT

An inlet assembly for a an abatement burner includes: an inlet conduit operable to convey an effluent gas stream to be treated from an inlet aperture via a bore to an outlet aperture for treatment; and a lance conduit operable to convey a fuel gas from a gas inlet aperture via a gas bore to a gas outlet aperture positioned within the bore for mixing with the effluent gas stream, a cross-sectional area of the gas bore increasing towards the gas outlet aperture. In this way, the expansion caused by the increasing cross-sectional area of the gas bore enhances the mixing of the fuel gas with the effluent gas stream which provides for improved destruction and removal efficiencies (DRE), which enables the inlet assembly to be operated with reduced quantities of fuel gas, while still maintaining required levels of DRE.

13 Claims, 5 Drawing Sheets

(51) Int. Cl.
*F23C 99/00* (2006.01)
*B01D 53/76* (2006.01)

(52) U.S. Cl.
CPC .............. *B01D 2257/204* (2013.01); *B01D 2257/2027* (2013.01); *B01D 2257/406* (2013.01); *B01D 2257/55* (2013.01); *B01D 2257/553* (2013.01); *B01D 2258/0216* (2013.01); *F23G 2209/142* (2013.01)

(58) Field of Classification Search
CPC ...... B01D 2257/2027; B01D 2257/406; B01D 2257/55; F23C 99/006; F23G 7/065; F23G 2209/142
See application file for complete search history.

(56) References Cited

U.S. PATENT DOCUMENTS

| | | |
|---|---|---|
| 2007/0217983 A1 | 9/2007 | Stanton et al. |
| 2009/0178394 A1 | 7/2009 | Crane, Jr. |
| 2015/0153041 A1 | 6/2015 | Neumeier |
| 2015/0176838 A1 | 6/2015 | Seeley |

FOREIGN PATENT DOCUMENTS

| | | |
|---|---|---|
| CN | 203785445 U | 8/2014 |
| EP | 0080216 A1 | 6/1983 |
| EP | 0132831 A2 | 2/1985 |
| EP | 0580060 A1 | 1/1994 |
| GB | 1276199 | 1/1972 |
| GB | 2107450 A | 4/1983 |
| GB | 2504468 A | 2/2014 |
| WO | 0204864 A1 | 1/2002 |

OTHER PUBLICATIONS

British Search Report dated Nov. 16, 2015 and Examination Report dated Nov. 17, 2015 for corresponding British Application No. GB1512672.5.

PCT Search Report and Written Opinion dated Nov. 18, 2016 for corresponding PCT Application No. PCT/GB2016/051861.

* cited by examiner

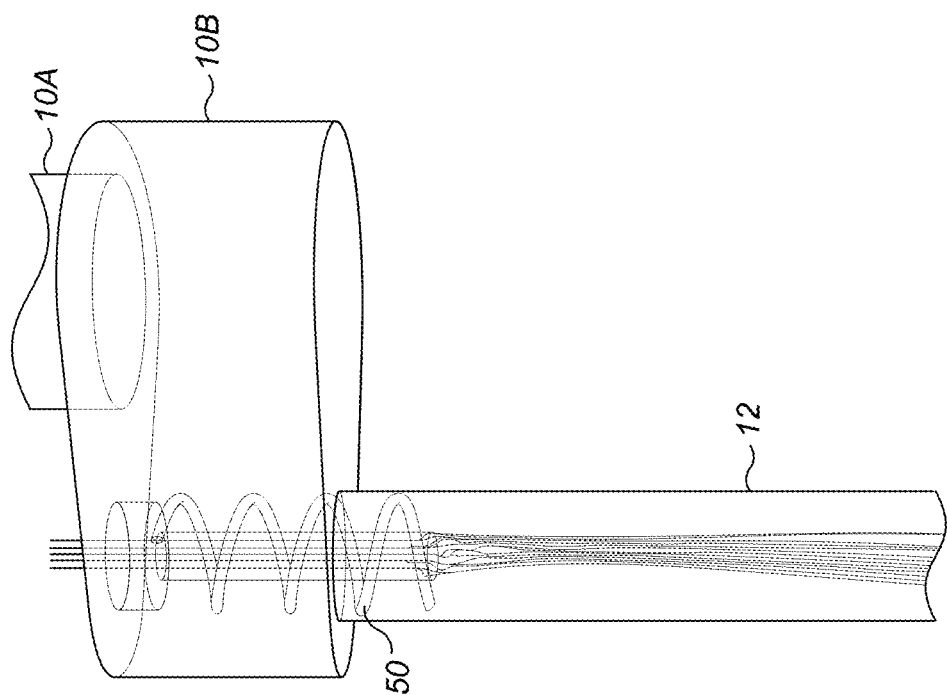
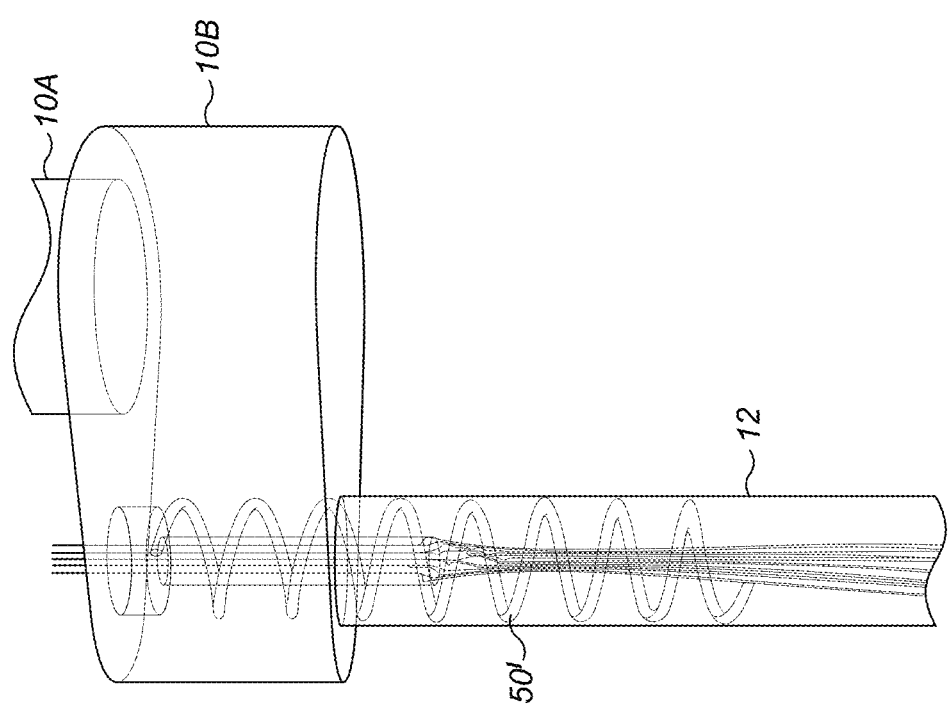

//INLET ASSEMBLY

CROSS-REFERENCE OF RELATED APPLICATION

This application is a Section 371 National Stage Application of International Application No. PCT/GB2016/051861, filed Jun. 22, 2016, which is incorporated by reference in its entirety and published as WO 2017/013384 A1 on Jan. 26, 2017 and which claims priority of British Application No. 1512672.5, filed Jul. 20, 2015.

FIELD

The embodiments relate to an inlet assembly for a burner and a method.

BACKGROUND

Abatement burners are known and are typically used for treating an effluent gas stream from a manufacturing process tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known burners use combustion to remove the PFCs and other compounds from the effluent gas stream. Typically, the effluent gas stream is a nitrogen stream containing PFCs and other compounds. In one arrangement, a fuel gas is mixed with the effluent gas stream and that gas stream mixture is conveyed into a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner being sufficient to consume not only the fuel gas supplied to the burner, but also all the combustibles in the gas stream mixture injected into the combustion chamber.

The range of compounds present in the effluent gas stream and the flow characteristics of that effluent gas stream can vary from process tool to process tool, and so the range of fuel gas and air, together with other gases or fluids that need to be introduced into the radiant burner will also vary.

Although techniques exist for processing the effluent gas stream, they each have their own shortcomings. Accordingly, it is desired to provide an improved technique for processing an effluent gas stream.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided an inlet assembly for an abatement burner, comprising: an inlet conduit operable to convey an effluent gas stream to be treated from an inlet aperture via a bore to an outlet aperture for treatment; and a lance conduit operable to convey a fuel gas from a gas inlet aperture via a gas bore to a gas outlet aperture positioned within the bore for mixing with the effluent gas stream, a cross-sectional area of the gas bore increasing towards the gas outlet aperture.

The first aspect recognizes that the processing of the effluent gas stream can be problematic, particularly when trying to achieve high destruction and removal efficiencies (DRE). In particular, acceptable DRE can be difficult to achieve when operating existing arrangements with reduced amounts of fuel and the DRE can reduce to unacceptable levels.

Accordingly, an inlet assembly or device is provided. The inlet assembly may be for a burner such as an abatement burner. The inlet assembly may comprise an inlet conduit. The inlet conduit may convey, guide or transport an effluent gas stream to be treated from an inlet aperture, along a bore, to an outlet aperture in order to be treated. The inlet assembly may also comprise a lance conduit. The lance conduit may convey, guide or transport a fuel gas stream from a gas inlet aperture, along a gas bore, to a gas outlet aperture. The gas outlet aperture may be positioned within the bore of the inlet conduit to facilitate mixing of the fuel gas with the effluent gas stream. The cross-sectional area of the gas bore may increase towards or at the gas outlet aperture. In this way, the expansion caused by the increasing cross-sectional area of the gas bore enhances the mixing of the fuel gas with the effluent gas stream which provides for improved DRE, which enables the inlet assembly to be operated with reduced quantities of fuel gas, while still maintaining required levels of DRE.

In one embodiment, a cross-sectional area of the gas outlet aperture is greater than a cross-sectional area of the gas inlet aperture. Accordingly, the cross-sectional area at the gas outlet aperture may be greater than the cross-sectional area of the bore near the inlet aperture. Increasing the cross-sectional area provides for expansion of the fuel gas, which facilitates more effective mixing with the effluent gas stream.

In one embodiment, the inlet conduit and the lance conduit are dimensioned to decrease a cross-sectional area of the bore towards the gas outlet aperture. Accordingly, the cross-sectional area of the bore, between an outer surface of the lance conduit and an inner surface of the bore, decreases towards or at the gas outlet aperture. In other words, the available or unfilled annular cross-sectional area between the inlet conduit and the lance conduit decreases towards or at the gas outlet aperture. This causes an increase in flow rate of the effluent gas stream to facilitate more efficient mixing with the fuel gas.

In one embodiment, an external cross-sectional perimeter of the lance conduit increases towards the gas outlet aperture. Accordingly, in order to decrease the cross-sectional area between the lance conduit and the inlet conduit, the cross-sectional perimeter or outer surface of the lance may be increased towards or at the gas outlet aperture in order to increase the flow rate of the effluent gas stream to facilitate more efficient mixing with the fuel gas.

In one embodiment, the lance conduit comprises a taper section which tapers outwardly proximate the gas outlet aperture. Accordingly, an outward taper or conical section may be provided on the external surface of the lance and may outwardly taper or flare proximate, near or at the gas outlet aperture. This taper section provides for a transition which increases the external cross-sectional perimeter of the lance and decreases the cross-sectional area of the bore in order to increase the flow rate of the effluent gas stream to facilitate more efficient mixing with the fuel gas.

In one embodiment, the taper section has a taper angle of up to around 60°. Accordingly, the taper may be angled by up to 60° when measured with respect to a longitudinal axis of the lance conduit.

In one embodiment, the taper angle is around 45°.

In one embodiment, the taper section defines at least one void operable to convey gas between the bore and the gas bore. Accordingly, the taper section itself may provide a void therewithin which may convey or transport gas between the bore and the gas bore. In other words, a void may be provided within the taper section which enables the effluent gas stream to be conveyed through that void, into the gas bore and/or enables the fuel gas to be conveyed through the void to the bore. Such a void helps to provide for more efficient mixing of the fuel gas and the effluent gas stream.

In one embodiment, the at least one void is configured to convey the effluent gas stream from the bore to the gas bore for pre-mixing therewithin. Accordingly, the void may convey or transport the effluent gas stream from the bore to the gas bore for pre-mixing with the fuel gas within the gas bore. Again, this improves the efficiency of mixing.

In one embodiment, the at least one void is configured to direct the effluent gas stream from the bore radially inwards into the gas bore for pre-mixing therewithin. Accordingly, the void may direct or guide the effluent gas stream towards the centre of the gas bore to improve premixing with the fuel gas.

In one embodiment, the at least one void is configured to convey the fuel gas from the gas bore to the bore for pre-mixing therewithin. Accordingly, the void may convey or direct the fuel gas from the gas bore and into the bore for premixing with the effluent gas stream within the bore.

In one embodiment, the at least one void is configured to direct the fuel gas from the gas bore radially outwards into the bore for pre-mixing therewithin. Accordingly, the void may direct or guide the fuel gas from the gas bore radially outwards into the bore to improve pre-mixing with the effluent stream.

In one embodiment, the at least one void comprises a slot in the taper section.

In one embodiment, the slot extends in an axial direction of the taper section.

In one embodiment, the taper section defines a plurality of the voids. Accordingly, more than one void may be provided, each of which facilitates mixing.

In one embodiment, the taper section defines an opposing pair of the voids.

In one embodiment, the taper section defines two opposing pairs of the voids. Such an arrangement may enable one opposing pair of voids to facilitate mixing from the bore into the gas bore, while the remaining pair of opposing slots may facilitate mixing from the gas bore to the bore.

In one embodiment, a flow restrictor positioned within the bore proximate the lance conduit. Providing a flow restrictor helps to speed the flow of the effluent gas stream and improves the efficiency of mixing.

In one embodiment, the flow restrictor extends at least partially along an axial length of the bore.

In one embodiment, the flow restrictor extends along the axial length of the bore no further than the gas outlet aperture.

In one embodiment, the flow restrictor comprises a helical spring. This enables reuse of an existing spring, where one is provided for cleaning of the bore.

In one embodiment, the inlet assembly comprises a fuel controller operable to control a ratio of fuel delivered to the lance conduit compared to a burner which receives mixed effluent gas stream and fuel gas from the outlet aperture.

In one embodiment, the ratio of fuel delivered to the lance conduit compared to the burner is greater than about 1.5:1.

In one embodiment, the ratio of fuel delivered to the lance conduit compared to the burner is greater than about 5:1.

According to a second aspect, there is provided a method, comprising: conveying an effluent gas stream to be treated from an inlet aperture of an inlet conduit via a bore to an outlet aperture for treatment; and conveying a fuel gas from a gas inlet aperture of a lance conduit via a gas bore to a gas outlet aperture positioned within the bore for mixing with the effluent gas stream, a cross-sectional area of the gas bore increasing towards the gas outlet aperture.

In one embodiment, the method comprises providing a cross-sectional area of the gas outlet aperture which is greater than a cross-sectional area of the gas inlet aperture.

In one embodiment, the method comprises dimensioning the inlet conduit and the lance conduit to decrease a cross-sectional area of the bore towards the gas outlet aperture.

In one embodiment, the method comprises increasing an external cross-sectional perimeter of the lance conduit towards the gas outlet aperture.

In one embodiment, the method comprises providing a taper section of the lance conduit which tapers outwardly proximate the gas outlet aperture.

In one embodiment, the method comprises providing the taper section with a taper angle of up to around 60°.

In one embodiment, the method comprises providing the taper section with a taper angle of around 45°.

In one embodiment, the method comprises defining at least one void in the taper section to convey gas between the bore and the gas bore.

In one embodiment, the method comprises conveying the effluent gas stream from the bore to the gas bore for pre-mixing therewithin using the at least one void.

In one embodiment, the method comprises directing the effluent gas stream from the bore radially inwards into the gas bore for pre-mixing therewithin using the at least one void.

In one embodiment, the method comprises conveying the fuel gas from the gas bore to the bore for pre-mixing therewithin using the at least one void.

In one embodiment, the method comprises directing the fuel gas from the gas bore radially outwards into the bore for pre-mixing therewithin using the at least one void.

In one embodiment, the at least one void comprises a slot in the taper section.

In one embodiment, the method comprises extending the slot in an axial direction of the taper section.

In one embodiment, the method comprises defining a plurality of the voids in the taper section.

In one embodiment, the method comprises defining an opposing pair of the voids in the taper section.

In one embodiment, the method comprises defining two opposing pairs of the voids in the taper section.

In one embodiment, the method comprises positioning a flow restrictor within the bore proximate the lance conduit.

In one embodiment, the method comprises extending the flow restrictor at least partially along an axial length of the bore.

In one embodiment, the method comprises extending the flow restrictor along the axial length of the bore no further than the gas outlet aperture.

In one embodiment, the flow restrictor comprises a helical spring.

In one embodiment, the method comprises controlling control a ratio of fuel delivered to the lance conduit compared to a burner which receives mixed effluent gas stream and fuel gas from the outlet aperture.

In one embodiment, the ratio of fuel delivered to the lance conduit compared to the burner is greater than about 1.5:1.

In one embodiment, the ratio of fuel delivered to the lance conduit compared to the burner is greater than about 5:1.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

The embodiments will now be described further, with reference to the accompanying drawings, in which:

FIGS. 4A and 4B illustrate streamlines showing fuel gas flow from a conventional lance.

DESCRIPTION OF THE EMBODIMENTS

Overview

Before discussing the embodiments in any more detail, first an overview will be provided. Embodiments provide an inlet assembly for an abatement burner, such as a ring burner, which is used to abate an effluent gas stream. The inlet assembly has a lance co-located within an inlet nozzle which delivers the effluent gas stream for abatement by the ring burner. The lance delivers fuel gas for premixing with the effluent gas stream prior to delivery to the ring burner. The lance is configured its gas outlet aperture to enhance mixing between the effluent gas stream and the fuel gas. Typically, the lance has a discontinuity, for example a taper, step or other arrangement, which enhances this premixing. A flow restrictor may be provided around the lance in order to further enhance such pre-mixing. The flow restrictor may be arranged to extend no further than the lance along the inlet nozzle, in order that a near-laminar flow is re-established before the mixed effluent gas stream and fuel gas exits the inlet nozzle to provide for stable combustion as the mixture exits the inlet nozzle. Such premixing has been found to provide more than acceptable DRE levels when using a ring burner with lower ratios of effluent stream gas to fuel gas than used in conventional abatement burners.

Abatement Burner—General Configuration and Operation

Figure 1:
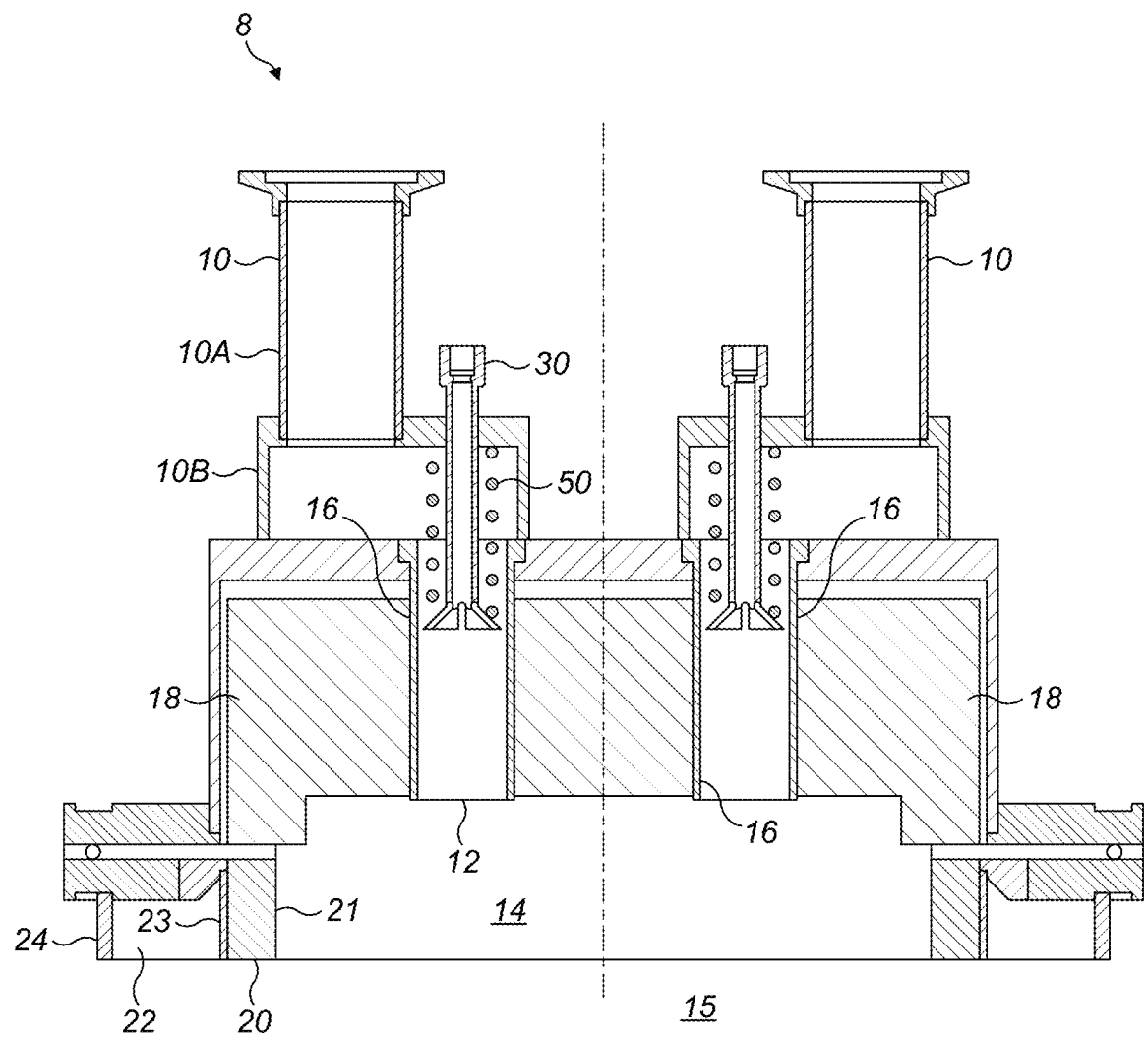
FIG. 1 illustrates schematically an abatement burner according to one embodiment.

FIG. 1 illustrates schematically an abatement burner, generally 8, according to one embodiment. The abatement burner 8 treats an effluent gas stream pumped from a manufacturing processing tool (not shown) such as a semiconductor or flat panel display process tool, typically by means of a vacuum-pumping system.

The effluent stream is received by an inlet structure 10. The effluent stream is conveyed by the inlet structure 10 to a nozzle structure 12. In this embodiment, the abatement burner 8 comprises four inlet structures 10 arranged circumferentially, each conveying an effluent gas stream pumped from a respective tool by a respective vacuum-pumping system. Alternatively, the effluent stream from a single process tool may be split into a plurality of streams, each one of which is conveyed to a respective inlet structure 10. Each nozzle structure 12 is located within a respective bore 16 formed in a ceramic top plate 18 which defines an upper or inlet surface of a combustion ring 14.

The combustion ring 14 has sidewalls defined by an exit surface 21 of a foraminous element 20. The foraminous element 20 is cylindrical and is retained within a cylindrical outer shell 24. A plenum volume 22 is defined between an entry surface 23 of the foraminous element 20 and the outer shell 24. A mixture of fuel gas, such as natural gas or a hydrocarbon, and air is introduced into the plenum volume 22 via inlet nozzles (not shown). The mixture of fuel gas and air passes from the entry surface 23 of the foraminous element 20 to the exit surface 21 of the foraminous element 20 for combustion within the combustion ring 14.

The inlet structure 10 has an inlet portion 10A which couples with a gallery portion 10B, which in turn couples with the nozzle structure 12. The elongate axis of the inlet portion 10A and the nozzle structure 12 are offset to facilitate the introduction of a lance 30, which is retained within the nozzle structure 12. In this embodiment, the lance 30 is concentrically and coaxially positioned within the nozzle structure 12. As will be explained in more detail below, the lance 30 introduces fuel gas for premixing with the effluent gas stream within the nozzle structure 12 prior to exiting from the nozzle structure 12. The nozzle structure 12 is surrounded concentrically by a fuel conduit 13 (not shown in FIG. 1, but illustrated in FIG. 2B) which also supplies fuel as the effluent gas stream and fuel gas exits from the nozzle structure 12. A helical spring 50 is located concentrically and coaxially around the lance 30, between the lance 30 and the nozzle structure 12. The helical spring 50 is coupled with an actuator (not shown) which provides for reciprocal displacement of the helical spring 50 in the axial direction of the lance 30 and the nozzle structure 12 to clean any deposits forming on the nozzle structure 12. In this embodiment, the helical spring 50 when at its shown rest position extends no further than the lance 30 in the axial direction, along the nozzle structure 12.

The effluent gas stream flows from the inlet portion 10A, through the gallery portion 10B and into the nozzle structure 12, which injects the premixed fuel gas and effluent stream into a cylindrical combustion ring 14. Fuel gas is introduced by the lance 30 into the nozzle structure 12 for premixing with the effluent gas stream. The configuration of the lance 30 and its relationship with the helical spring 50 provides for particularly effective premixing, as will be explained in more detail below. The mixed effluent gas stream and fuel gas exits the nozzle structure 12 where it is surrounded by fuel gas from the fuel conduit 13 and heated and combusted within the combustion ring 14. The combustion provides combustion products, such as oxygen, typically within a nominal range of 7.5% to 10.5%, depending on the fuel air mixture ($CH_4$, $C_3H_8$, $C_4H_{10}$) and the firing rate of the combustion burner 14. The heat and combustion products react with the effluent gas stream and fuel gas mixture to clean the effluent gas stream. For example, $SiH_4$ and $NH_3$ may be provided within the effluent gas stream, which reacts with $O_2$ within the combustion chamber to generate $SiO_2$, $N_2$, $H_2O$, $NO_x$. Similarly, $N_2$, $CH_4$, $C_2F_6$ may be provided within the effluent gas stream, which reacts with $O_2$ to generate $CO_2$, HF and $H_2O$. The ratio of the mixture of fuel gas and air is varied to vary the nominal temperature within the combustion ring 14 to that which is appropriate for the effluent gas stream to be treated. The exhaust 15 of the combustion ring 14 is open to enable the combustion products to be output from the abatement burner 8.

Lance Configuration

Figure 2A:
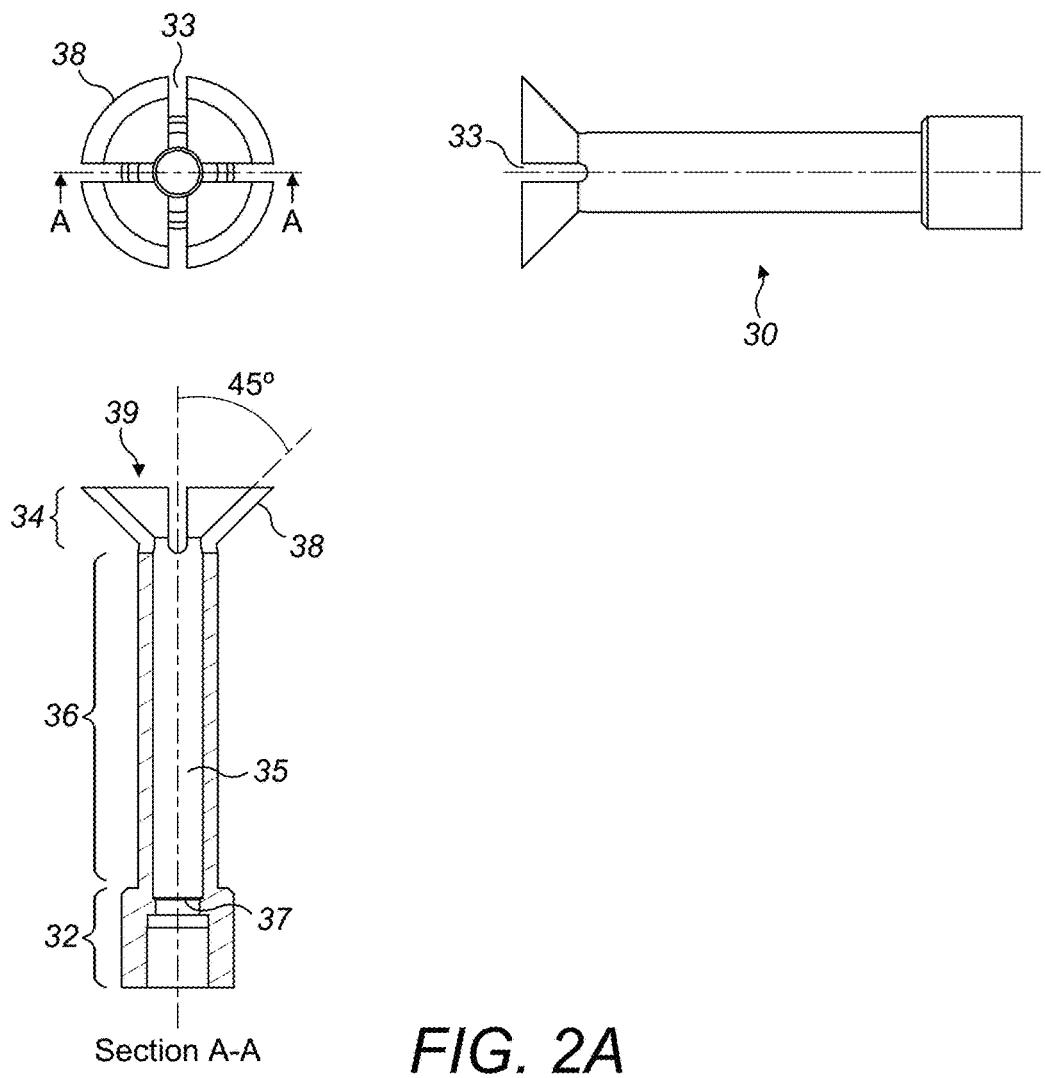
FIG. 2A illustrates the configuration of a lance according to one embodiment.
Figure 2B:
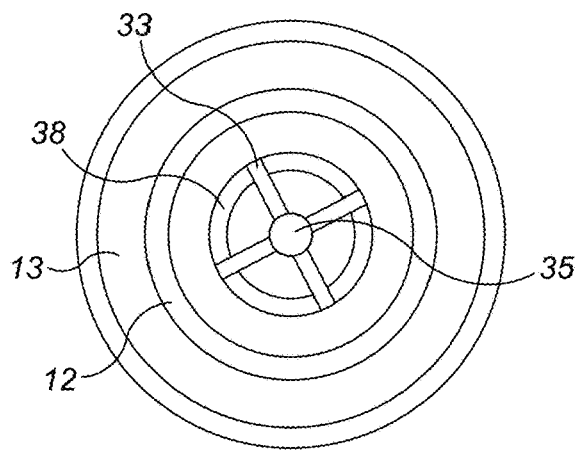
FIG. 2B is a view looking along a nozzle structure, showing the lance installed and a concentric conduit.

FIG. 2 illustrates the configuration of the lance 30, according to one embodiment. As can be seen, the lance 30 has an inlet coupling 32 which couples with a conduit (not shown) which supplies the fuel gas from a gas inlet aperture 37 via a bore 35 defined by a cylindrical section 36 to a gas outlet aperture 39 defined by a tapered portion 34. The tapered portion is frustoconical, having a conical sidewall 38 within which slots 33 are formed. In this embodiment, the conical sidewall 38 extends at an angle of around 45° from the elongate axis of the lance 30. However, angles less than this and up to around 60° have been found to improve mixing. Also, in this embodiment there are provided four slots 33, but fewer or more than this may also be provided. Also, the slots 33 need not fully extend along the whole length of the tapered portion 34 and instead individual holes within the tapered portion 34 are sufficient to facilitate mixing.

Fluid Flow and Mixing

Figure 3A:
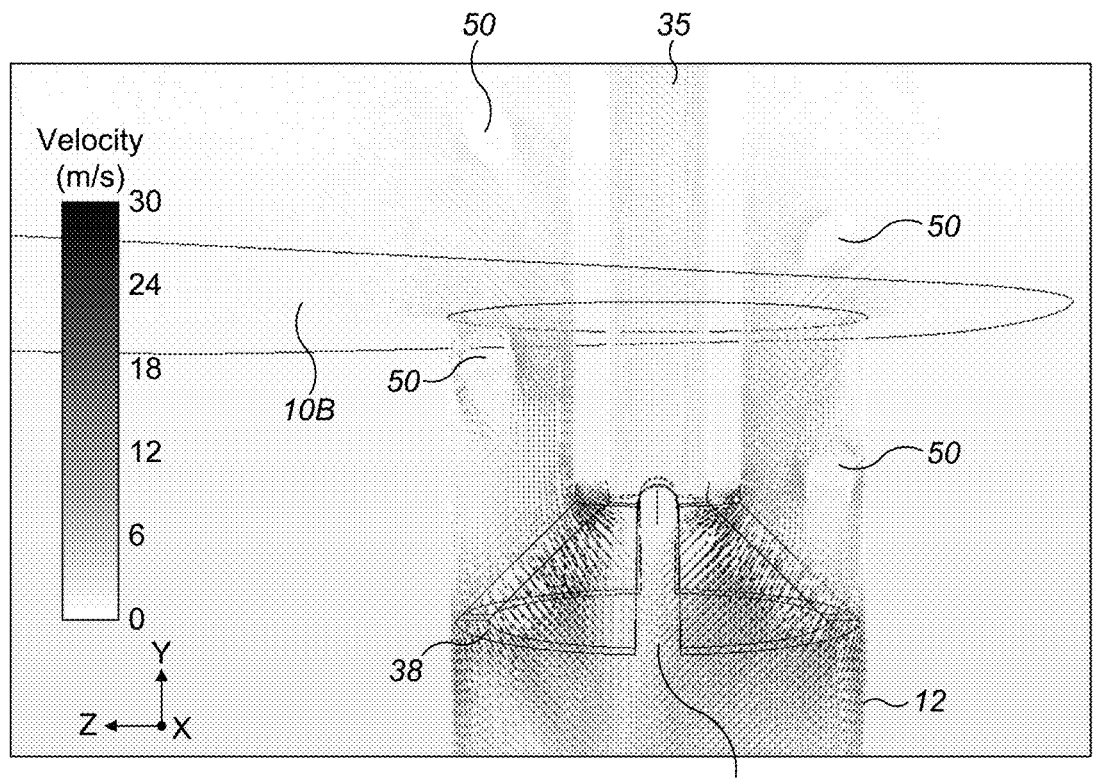
FIG. 3A is a vector plot simulation showing fluid flow speed and direction taken on a plane through an opposing pair of slots.

FIG. 3A is a vector plot simulation showing fluid flow speed and direction taken on a plane through an opposing pair of slots 33. As can be seen, the velocity of the effluent gas stream is increased in the vicinity of the gas outlet aperture 39 by the presence of the helical spring 50 and the tapered portion 34 of the lance 30.

Some of the effluent gas stream is then forced through the opposing pair of slots 33 and mixes with the fuel gas travelling from the bore 35 into the tapered portion 34 of the lance 30.

Figure 3B:
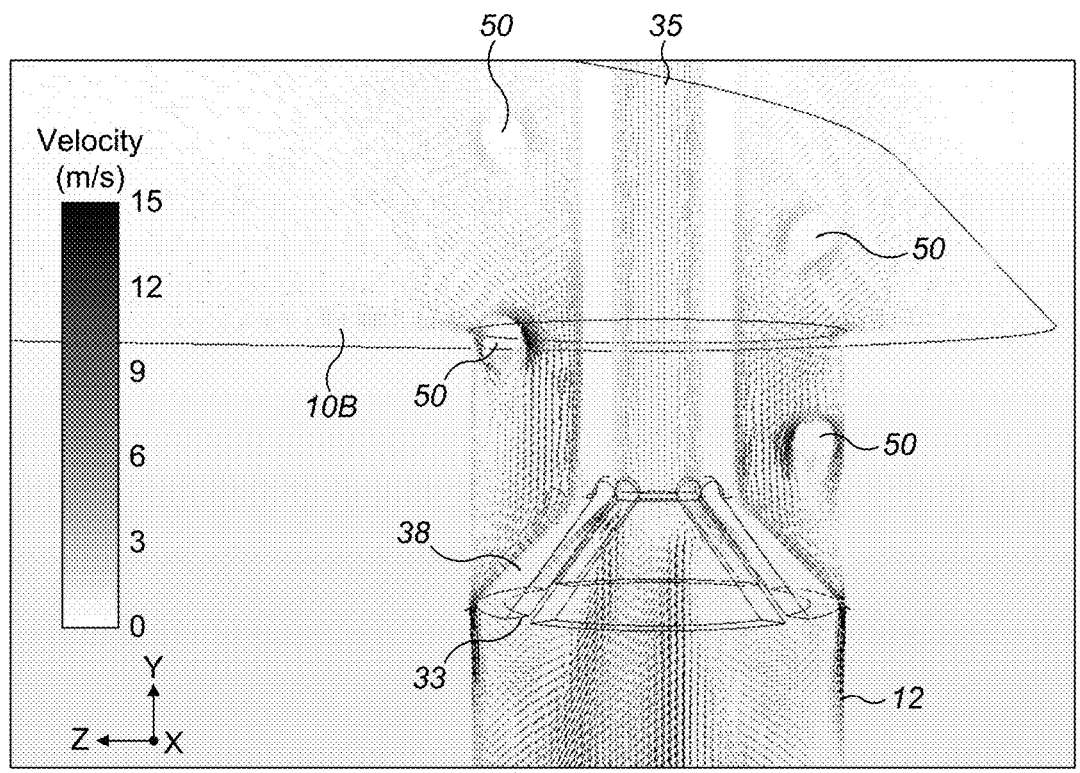
FIG. 3B is a vector plot simulation on a plane of 45° from FIG. 3A.

FIG. 3B is a vector plot simulation on a plane of 45° from FIG. 3A. As can be seen, the gas stream mixture within the tapered portion 34 exits the gas outlet aperture 39 and mixes with the effluent gas stream which has been accelerated by the outer surface of the tapered portion 34 and the helical spring 50.

Fuel Gas Flow and Mixing

FIGS. 4A and 4B illustrate the streamlines showing the fuel gas flow (in this example, propane) from a conventional lance (which omits the tapered portion 34). These streamline illustrations assume the flow through the inlet structure 10 is 50 standard litres per minute of nitrogen, 18 standard litres per minute oxygen and the flow rate of fuel gas through the lance 30 is 3.2 standard litres per minute. In particular, FIG. 4A shows the streamlines of the fuel gas flow where the helical spring 50 extends in the axial direction past the lance within the nozzle structure 12, whilst FIG. 4B shows the streamlines of the fuel gas flow when the helical spring 50 extends in the axial direction no further than the lance. As can be seen, the fuel gas stays generally within a central, axial region of the nozzle structure 12 and is surrounded coaxially by an outer sheath of effluent gas stream. The mole fraction of fuel gas drops due to dilution in the effluent gas stream.

Figure 4C:
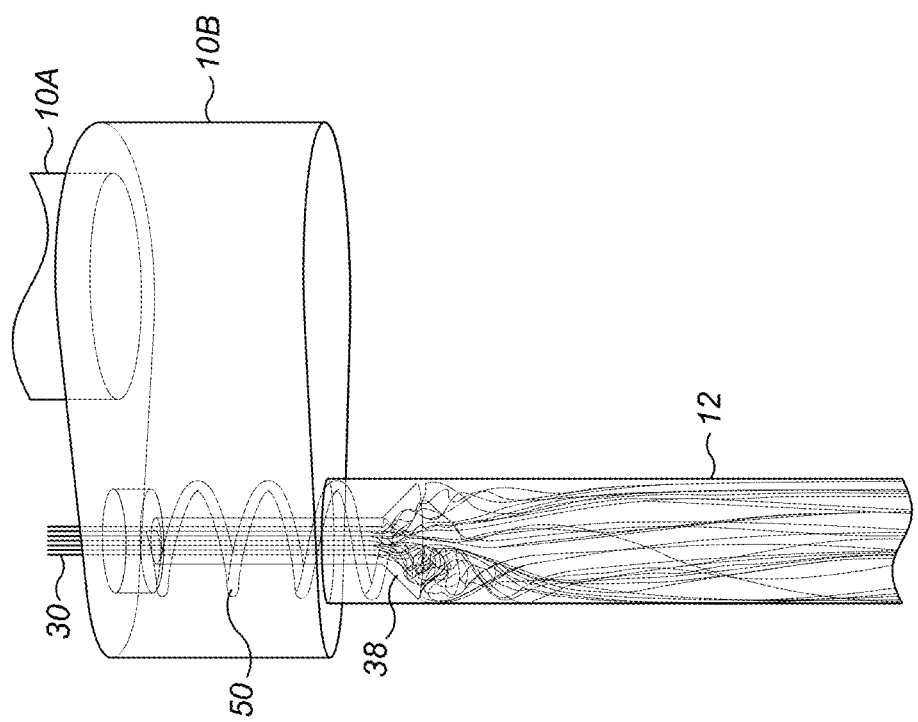
FIGS. 4C and 4D illustrate streamlines showing fuel gas flow from the lance of FIG. 2.
Figure 4D:
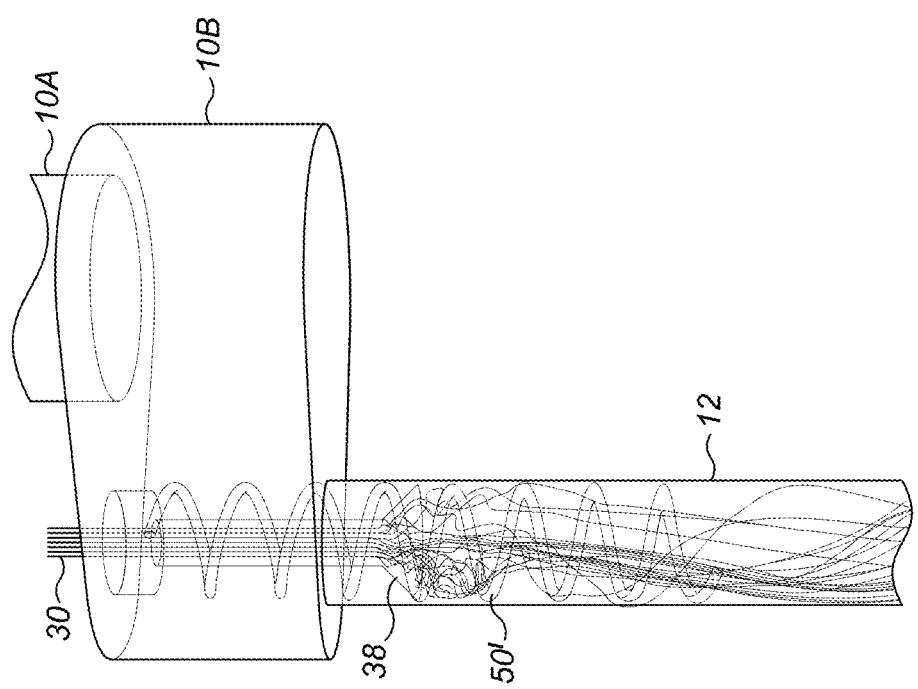

FIGS. 4C and 4D illustrate the streamlines of fuel gas flow (in this example, propane) from the lance 30. In particular, FIG. 4C illustrates the streamlines of fuel gas flow from the lance 30 when the helical spring 50' extends in the axial direction beyond the lance 30, within the nozzle structure 12. These streamline illustrations assume the flow through the inlet structure 10 is 50 standard litres per minute of nitrogen, 18 standard litres per minute oxygen and the flow rate of fuel gas through the lance 30 is 3.2 standard litres per minute. As can be seen, enhanced mixing occurs due to the presence of the tapered portion 34, but the fuel gas flow is more turbulent. However, as can be seen in FIG. 4D, increased mixing occurs due to the presence of the tapered portion 34, but the turbulent flow is minimized by terminating the helical spring 50 such that it extends in the axial direction into the nozzle structure 12 no further than the gas outlet aperture 39 of the lance 30. The mole fraction of fuel gas drops due to dilution in the effluent gas stream.

Accordingly, it can be seen that the presence of the tapered portion 34, together with the shorter length of the spring 50, provides for increased mixing of the fuel gas with the effluent gas stream, while avoiding unnecessary turbulence and producing near laminar flow as the mixed effluent stream and fuel gas exits the nozzle structure 12.

Table 1 shows experimental data for a variety of different lance configurations. In this arrangement, propane was provided to both the lance 30, the concentric fuel conduit 13 and the combustion ring 14, together with oxygen. As can be seen, the highest rates of DRE occurred with four slots 33 and a length of 45 mm.

TABLE 1

| Lance type | | | $C_3H_8$ (lpm) | | | $O_2$ (lpm) | [$CF_4$] | |
| --- | --- | --- | --- | --- | --- | --- | --- | --- |
| Length | Slits | Angle | Lance | Concentric | Total | Premix | (ppm) | DRE |
| Conventional | | | 1.8 | 1.5 | 3.3 | 18 | 1400 | 53.3% |
| 4 | 4 | 15 | 1.8 | 1.5 | 3.3 | 18 | 1150 | 61.7% |
| 4.5 | 4 | 45 | 1.8 | 1.5 | 3.3 | 18 | 1040 | 65.3% |
| 3.5 | 4 | 15 | 1.8 | 1.5 | 3.3 | 18 | 1085 | 63.8% |
| 4 | 5 | 15 | 1.8 | 1.5 | 3.3 | 18 | 1125 | 62.5% |
| 4 | 3 | 15 | 1.8 | 1.5 | 3.3 | 18 | 1120 | 62.7% |

Table 2 shows how increasing the amount of propane delivered by the lance 30 and decreasing the amount of propane delivered by the concentric fuel conduit 13 when using the lance 30 dramatically increases the DRE. Table 2 also shows that maximum DRE occurs when the helical spring 50 is present and when it does not extend further than the lance 30 within the nozzle structure 12.

TABLE 2

| Lance type | | | $C_3H_8$ (lpm) | | | $O_2$ (lpm) | Spring | $[CF_4]$ | |
|---|---|---|---|---|---|---|---|---|---|
| Length | Slits | Angle | Lance | Concentric | Total | Premix | Length (mm) | (ppm) | DRE |
| 4.5 | 4 | 45 | 3.2 | 0.6 | 3.8 | 18 | 0 | 235 | 92.2% |
| 4.5 | 4 | 45 | 3.2 | 0.6 | 3.8 | 18 | 70 | 180 | 94.0% |
| 4.5 | 4 | 45 | 3.2 | 0.6 | 3.8 | 17 | 50 | 130 | 95.7% |
| 4.5 | 4 | 45 | 3.2 | 0.6 | 3.8 | 18 | 40 | 100 | 96.7% |
| Conventional | | | 3.2 | 0.6 | 3.8 | 18 | 40 | 530 | 82.3% |
| Conventional | | | 3.2 | 0.6 | 3.8 | 18 | 70 | 290 | 90.3% |
| Conventional | | | 3.0 | 1.8 | 4.8 | 19 | 70 | 150 | 95.0% |

Accordingly, it can be seen that embodiments provide an ultra-low fuel lance design that has a split end, which improves the fuel, processed gas and oxygen mixing which increases PFC gas abatement efficiency. Furthermore, embodiments enable a 30% injection fuel reduction while still achieving greater than 95% DRE. Embodiments provide for etch ultra-low fuel $CF_4$ abatement which replaces radiant combustors with a horizontal chamber, which provide a constant flame ignition source for the effluent stream process gases and propane/air mix. A conventional lance with a 70 mm spring and inject settings of 3.3 standard litres per minute propane (1.8 standard litres per minute on lance, 1.5 standard litres per minute on coaxial (concentric fuel conduit), 18 standard litres per minute oxygen could only achieve 71% DRE).

The ultra-low fuel propane lance is 40 mm long, with four, 4.5 mm depth slits 90° apart at the end of the lance angled 45° outward and cooperating with a 40 mm actuator spring. The spring creates some turbulence to the incoming mixture of process gas and oxygen which were mixed upstream at a premix port prior to entering the inlet head nozzle. As the 40 mm spring is the same length as the lance, it does not overlap the lance tip where the lance fuel inject exits into the nozzle. The propane exiting from the lance mixes with the process gas and oxygen mixture stream within the nozzle before exiting the end of the nozzle in a laminar flow. This mixing arrangement demonstrated enhanced destruction of PFC gases.

In addition to being able to perform greater than 95% DRE with a total propane injection flow of 3.6 standard litres per minute (3 standard litres per minute on lance, 0.6 standard litres per minute on coaxial, 18 standard litres per minute oxygen) there is a fuel flow reduction of approximately 30% compared to the conventional lance configuration. The conventional lance requires 4.8 standard litres per minute propane (3 standard litres per minute on lance, 1.8 standard litres per minute on coaxial, 19 standard litres per minute oxygen) to achieve greater than 95% DRE.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An inlet assembly for an abatement burner, comprising:
an inlet conduit operable to convey an effluent gas stream to be treated from an inlet aperture via a bore to an outlet aperture for treatment; and
a lance conduit operable to convey a fuel gas from a gas inlet aperture via a gas bore to a gas outlet aperture positioned within said bore for mixing with said effluent gas stream, a cross-sectional area of said gas bore increasing towards said gas outlet aperture wherein said lance conduit comprises a taper section which tapers outwardly proximate said gas outlet aperture and wherein said taper section defines at least one void operable to convey gas between said bore and said gas bore.

2. The inlet assembly of claim 1, wherein a cross-sectional area of said gas outlet aperture is greater than a cross-sectional area of said gas inlet aperture.

3. The inlet assembly of claim 1, wherein said inlet conduit and said lance conduit are dimensioned to decrease a cross-sectional area of said bore towards said gas outlet aperture.

4. The inlet assembly of claim 1, wherein an external cross-sectional perimeter of said lance conduit increases towards said gas outlet aperture.

5. The inlet assembly of claim 1, wherein said taper section has a taper angle of up to around 60°.

6. The inlet assembly of claim 1, wherein said at least one void is configured to direct said effluent gas stream from said bore radially inwards into said gas bore for pre-mixing therewithin.

7. The inlet assembly of claim 1, wherein said at least one void is configured to direct said fuel gas from said gas bore radially outwards into said bore for pre-mixing therewithin.

8. The inlet assembly of claim 1, wherein said taper section defines a plurality of voids.

9. The inlet assembly of claim 1, wherein said taper section defines an opposing pair of voids.

10. The inlet assembly of claim 1, wherein said taper section defines two opposing pairs of voids.

11. The inlet assembly of claim 1, further comprising a flow restrictor positioned within said bore proximate said lance conduit.

12. The inlet assembly of claim 11, wherein said flow restrictor extends along said axial length of said bore no further than said gas outlet aperture.

13. A method, comprising:
conveying an effluent gas stream to be treated from an inlet aperture of an inlet conduit via a bore to an outlet aperture for treatment; and
conveying a fuel gas from a gas inlet aperture of a lance conduit via a gas bore to a gas outlet aperture positioned within said bore for mixing with said effluent gas stream, a cross-sectional area of said gas bore increasing towards said gas outlet aperture wherein said lance conduit comprises a taper section which tapers outwardly proximate said gas outlet aperture and wherein said taper section defines at least one void operable to convey gas between said bore and said gas bore.

\* \* \* \* \*